Patented Oct. 4, 1938

2,131,731

UNITED STATES PATENT OFFICE 2,131,731

DIPHENYL DERIVATIVE

Sebastian Gassner and Berthold Bienert, Leverkusen-I. G. Werk, Germany, assignors to General Aniline Works, Inc., New York, N. Y., a corporation of Delaware No Drawing. Application February 12, 1937, Serial No. 125,433. In Germany October 23, 1935

1 Claim. (Cl. 260—99.30)

The present invention is concerned with the preparation of 3,4-dicyanodiphenyl which represents a valuable intermediate product, for instance, for the preparation of dyestuffs.

The preparation of 3,4-dicyanodiphenyl has been described first in our co-pending application Ser. No. 106,829, filed October 21, 1936, and in this respect the present invention is to be considered as a continuation in part application of the said earlier application. According to application No. 106,829 the 3,4-dicyanodiphenyl can be obtained by starting from 3-nitro-4-aminodiphenyl, converting the amino group into the cyanic group according to the Sandmeyer's reaction and then reducing the nitro group to the amino group whereupon the latter is transformed into the cyanic group. We have furthermore found that the 3,4-dicyanodiphenyl can be obtained in a good yield by heating 4-cyanodiphenyl-3-sulfonic acid, preferably in form of its alkali metal salt, with salts of the ferrocyanic acid or of hydrocyanic acid which are suitably employed as alkali metal salts. The reaction may be performed at a temperature between about 250 to about 340° C. The 3,4-dicyanodiphenyl formed by this reaction can be isolated from the reaction mixture by subliming at about 340° C. The 3,4-dicyanodiphenyl can be recrystallized from benzene and has in a pure state the melting point of 161–162° C.

The following example illustrates the invention without, however, restricting it thereto (the parts being by weight):—

Example 1 part of the sodium or potassium salt of the 4-cyanodiphenyl-3-sulfonic acid and 2 parts of anhydrous potassium ferrocyanide are gradually heated in a vacuum subliming apparatus to a temperature of about 300° C. After having kept the reaction mixture for a prolonged time at this temperature (for about 10 hours) it is heated to 340° C., the 3,4-dicyanodiphenyl thus formed subliming thereby. 80% of the reaction product are obtained which on recrystallizing from 5 times its quantity of benzene represents leaflets of a melting point of 161–162° C.

Similar results are obtained when using potassium cyanide instead of potassium ferrocyanide.

The 4-cyanodiphenyl-3-sulfonic acid can be obtained by heating 4-aminodiphenyl together with chlorosulfonic acid in o-dichlorobenzene and replacing the amino group by the cyanic group according to the Sandmeyer's reaction.

We claim:—

As a new product, 3,4-dicyanodiphenyl.

SEBASTIAN GASSNER.
BERTHOLD BIENERT.